UNITED STATES PATENT OFFICE.

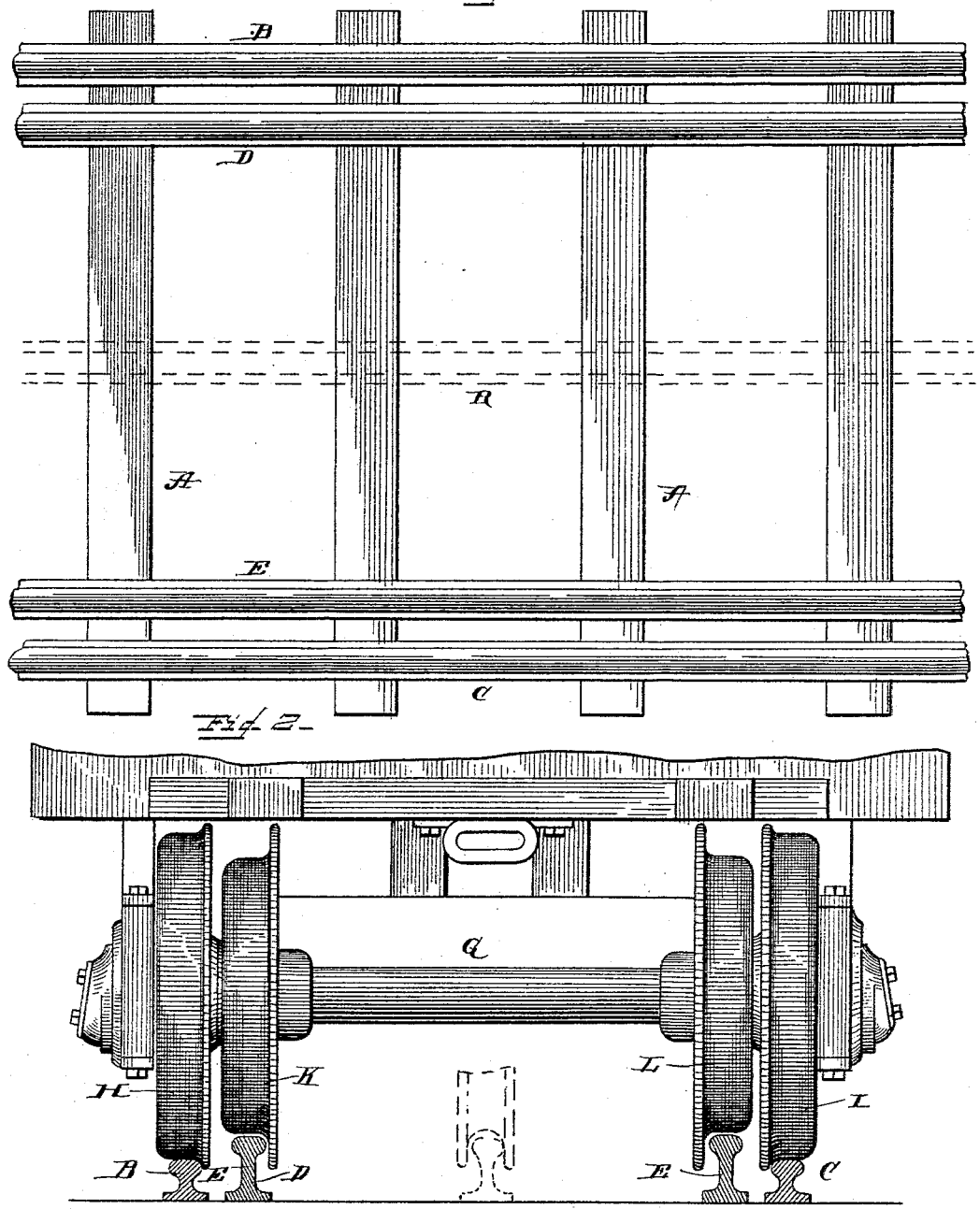

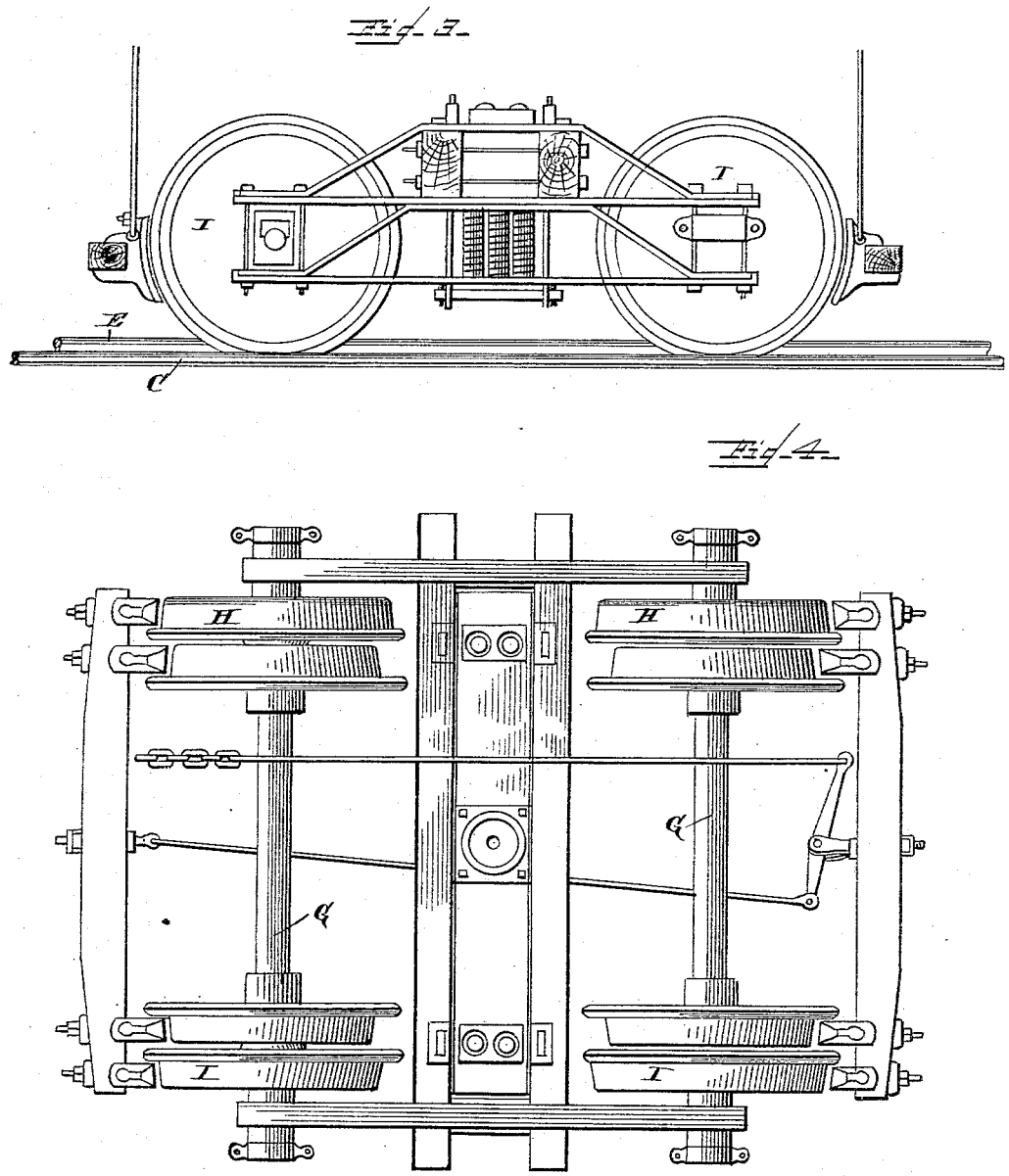

HENRY DENMAN THOMPSON, OF WEST SWANZEY, NEW HAMPSHIRE, ASSIGNOR OF ONE-FOURTH TO GEORGE W. RYER, OF BROOKLYN, NEW YORK.

SAFETY CAR-TRUCK.

SPECIFICATION forming part of Letters Patent No. 388,743, dated August 28, 1888.

Application filed January 27, 1888. Serial No. 262,168. (No model.)

*To all whom it may concern:*

Be it known that I, HENRY DENMAN THOMPSON, a citizen of the United States, residing at West Swanzey, in the county of Cheshire and State of New Hampshire, have invented certain new and useful Improvements in Safety-Rails; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to safety rails and trucks for railroads; and it consists in the construction and novel combination of parts, as hereinafter fully described, and particularly pointed out in the claims.

In the drawings, Figure 1 is a plan view of my improved double-railed single track. Fig. 2 is an elevation of an improved car-truck, the double-railed single track being shown in full lines in cross-section, the modification being indicated in dotted lines in said figure. Fig. 3 is a side elevation of my improved track and truck, and Fig. 4 is a plan view of my improved car-truck.

Referring by letter to the accompanying drawings, A designates the rail-ties, which are of the kind ordinarily used.

B and C are the ordinary T-rails, which are secured to the ties in the usual manner.

Between the rails B and C, and preferably quite near to them, are two auxiliary rails, D and E, the webs F of which are made higher or greater in vertical dimensions than the outer or main rails, B C.

G designates one of the axles of the truck, which is provided near its ends with the ordinary flanged car-wheels, H I, which travel on the main track-rails B C so long as the latter remain in place.

In order to prevent derailment of the truck, the axle G is provided with the two intermediate flanged car-wheels, K L, the diameters of which are slightly less than the diameters of the car-wheels H I, so that normally said intermediate wheels will be out of contact with the auxiliary rails D E; but in the event of one or either of the outer or main rails becoming displaced one, either, or both of the auxiliary or intermediate wheels will come in contact with the intermediate rail or rails, as the case may be, and will prevent the derailment of the truck or car.

Having thus fully described my invention, what I claim as new, and desire to secure by Letters Patent of the United States, is—

1. The combination, with a car-truck having outer flanged wheels and intermediate flanged wheels thereon, of a railway-track having outer track-rails and intermediate track-rails, substantially as specified.

2. The combination, with a single track provided with outer and intermediate track-rails, of a car-truck the axles of which are provided with outer flanged car-wheels and intermediate flanged car-wheels of lesser diameter than the outer car-wheels, substantially as specified.

3. The combination, with a single railroad-track having outer track-rails and intermediate track-rails of greater height than the outer rails, of a car-truck the axles of which are provided with flanged outer wheels and flanged intermediate wheels of lesser diameters than the flanged outer wheels, substantially as specified.

In testimony whereof I affix my signature in presence of two witnesses.

HENRY DENMAN THOMPSON.

Witnesses:
GEO. W. RYER,
WILLIAM F. HOLTON.